United States Patent
Riha

(10) Patent No.: US 11,129,238 B1
(45) Date of Patent: Sep. 21, 2021

(54) BATTERY POWERED WIRELESS CONTROLLER SYSTEM

(71) Applicant: Gary D. Riha, Green Bay, WI (US)

(72) Inventor: Gary D. Riha, Green Bay, WI (US)

(*) Notice: Subject to any disclaimer, the term of this patent is extended or adjusted under 35 U.S.C. 154(b) by 129 days.

(21) Appl. No.: 16/732,650

(22) Filed: Jan. 2, 2020

(51) Int. Cl.
| | |
|---|---|
| H04W 4/00 | (2018.01) |
| H04W 84/20 | (2009.01) |
| G08B 13/196 | (2006.01) |
| G08C 17/02 | (2006.01) |

(52) U.S. Cl.
CPC ........ H04W 84/20 (2013.01); G08B 13/1966 (2013.01); G08C 17/02 (2013.01)

(58) Field of Classification Search
CPC ..... H04W 84/20; H04W 36/03; H04W 36/24; H04W 36/38; H04W 36/385; H04W 4/70; H04W 52/0212; H04W 52/0261; H04W 88/04; H04W 88/06; H04W 88/12; G08B 13/1966; G08C 17/02; H04B 1/034; H04B 1/385; H04B 2001/3861; H04B 2203/542; H04B 2203/5445; H04B 2203/547; H04B 2203/5475; H04B 2203/5483; H04L 67/12; H04L 67/16; H04L 69/03; H04L 69/08; H04L 67/125; H04L 67/306
See application file for complete search history.

(56) References Cited

U.S. PATENT DOCUMENTS

| | | | | |
|---|---|---|---|---|
| 4,866,630 A | * | 9/1989 | Beaman ................ | B23D 53/04 700/160 |
| 6,119,659 A | * | 9/2000 | Wright .................... | F02D 41/20 123/490 |
| 6,526,341 B1 | * | 2/2003 | Bird ........................ | G07C 5/008 340/573.1 |
| 7,438,180 B1 | * | 10/2008 | Taylor .................... | B65G 21/10 198/812 |
| 8,195,844 B2 | * | 6/2012 | Fulton .................... | G05B 19/05 710/20 |
| 9,394,654 B2 | * | 7/2016 | Perkins, Jr. ............. | E21C 25/16 |
| 9,910,414 B2 | * | 3/2018 | Awerbuch .............. | G05B 15/02 |
| 10,065,337 B1 | * | 9/2018 | Steciak, Jr. ............ | B23D 47/12 |
| 10,808,531 B2 | * | 10/2020 | de Sousa ................ | E21C 27/20 |
| 11,058,064 B2 | * | 7/2021 | Combs, III ............ | A01B 63/10 |

(Continued)

*Primary Examiner* — Stephen M D Agosta
(74) *Attorney, Agent, or Firm* — Donald J. Ersler

(57) ABSTRACT

A battery powered controller system preferably includes at least one battery, a master programmable controller, a slave programmable controller, a master wireless communication device and a slave wireless communication device. The master wireless communication device is connected to the master programmable controller. The slave wireless communication device is connected to the slave programmable controller. The master programmable controller sends instructions to the slave programmable controller through the master and slave wireless communications. The master programmable controller and the master wireless communication device are attached to a base unit. The slave wireless communication device and the slave programmable controller are attached to a rotational head. The slave programmable controller and the slave wireless communication device are powered by the battery through power input ports. Output ports of the slave programmable controller are connected to a plurality of hydraulic valve solenoids and/or at least one sensor.

6 Claims, 3 Drawing Sheets

(56) References Cited

U.S. PATENT DOCUMENTS

| | | | | |
|---|---|---|---|---|
| 2003/0078071 A1* | 4/2003 | Uchiyama | H04M 1/57 | |
| | | | 455/557 | |
| 2005/0020258 A1* | 1/2005 | Aslanian | H04M 1/04 | |
| | | | 455/426.1 | |
| 2007/0018622 A1* | 1/2007 | Chen | H02M 1/10 | |
| | | | 323/282 | |
| 2009/0131150 A1* | 5/2009 | Iverson | G07F 17/3213 | |
| | | | 463/20 | |
| 2009/0272462 A1* | 11/2009 | Kauppila | B27B 17/0091 | |
| | | | 144/24.13 | |
| 2010/0018514 A1* | 1/2010 | Wills, II | B28D 1/042 | |
| | | | 125/13.01 | |
| 2010/0162674 A1* | 7/2010 | Eaton | A01D 34/828 | |
| | | | 56/10.5 | |
| 2011/0197389 A1* | 8/2011 | Ota | H02J 7/0063 | |
| | | | 15/339 | |
| 2012/0106655 A1* | 5/2012 | Olesen | H04Q 9/00 | |
| | | | 375/256 | |
| 2012/0256099 A1* | 10/2012 | Gregerson | A61B 6/035 | |
| | | | 250/453.11 | |
| 2012/0279614 A1* | 11/2012 | Terrell | A01G 23/095 | |
| | | | 144/343 | |
| 2013/0066304 A1* | 3/2013 | Belson | A61B 1/3132 | |
| | | | 606/1 | |
| 2014/0300282 A1* | 10/2014 | Grave | H05B 45/10 | |
| | | | 315/185 R | |
| 2015/0142362 A1* | 5/2015 | Jordan | B01F 15/00201 | |
| | | | 702/96 | |
| 2016/0146226 A1* | 5/2016 | Goedken | F16H 61/42 | |
| | | | 60/431 | |
| 2017/0079220 A1* | 3/2017 | Hunt | A01G 23/091 | |
| 2018/0054953 A1* | 3/2018 | Martin | A01B 27/005 | |
| 2018/0194575 A1* | 7/2018 | Anderson | B65G 47/02 | |
| 2019/0009424 A1* | 1/2019 | Steciak, Jr. | B23D 59/001 | |
| 2019/0243322 A1* | 8/2019 | Norton | G05B 19/042 | |
| 2019/0264700 A1* | 8/2019 | Huggins | F04D 27/002 | |
| 2020/0307329 A1* | 10/2020 | Koster | B60W 60/0025 | |

* cited by examiner

BATTERY POWERED WIRELESS CONTROLLER SYSTEM

BACKGROUND OF THE INVENTION

1. Field of the Invention

The present invention relates generally to commercial equipment and more specifically to a battery powered wireless controller system, which eliminates a rotary connection for two electrical wires for any device which swivels or rotates relative to a base.

2. Discussion of the Prior Art

It appears that the prior art does not teach or suggest a battery powered controller.

Accordingly, there is a clearly felt need in the art for a battery powered controller system, which eliminates a rotary connection for two electrical wires for any device which swivels or rotates relative to a base, such as a saw head.

SUMMARY OF THE INVENTION

The present invention provides a battery powered controller system, which eliminates a rotary connection for two electrical wires for any device which swivels or rotates relative to a base. The battery powered controller system preferably includes at least one battery, a master programmable controller, a slave programmable controller, a master wireless communication device and a slave wireless communication device. Each battery is preferably a power tool battery, but other types of batteries may also be used. The battery is preferably retained a battery holder. The slave and master programmable controllers are preferably any suitable microprocessor based controllers. The slave programmable controller must be capable of receiving inputs between 5 volts-36 volts. It is preferable that the slave programmable controller have 5, 12 and 24 volt output ports. The master wireless communication device is connected to the master programmable controller. The slave wireless communication device is connected to the slave programmable controller. The master programmable controller sends instructions to the slave programmable controller through the master and slave wireless communication devices. The communication protocol between the master and slave controllers is preferably CAN (Controller Area Network). The master and slave wireless communication devices preferably use Bluetooth, but other wireless protocols may also be used.

The master programmable controller and the master wireless communication device are attached to a base unit and electrically connected to a source of electrical power from the base unit. The battery holder, the slave wireless communication device and the slave programmable controller are retained on a saw head. The slave controller and the slave wireless communication device are powered by the at least one battery through a power input port. Output ports of the slave programmable controller are electrically connected to a plurality of hydraulic valve solenoids. Each hydraulic valve solenoid controls the flow of hydraulic fluid to at least one hydraulic cylinder, a hydraulic motor or any other hydraulically operated device. At least one input port of the slave programmable controller is electrical connected to at least one sensor. The at least one sensor detects a position of a chain saw of a saw head or the like.

Accordingly, it is an object of the present invention to provide a battery powered wireless controller system, which eliminates a rotary connection for two electrical wires for any device which swivels or rotates relative to a base, such as a saw head.

These and additional objects, advantages, features and benefits of the present invention will become apparent from the following specification.

DETAILED DESCRIPTION OF THE PREFERRED EMBODIMENTS

Figure 1:
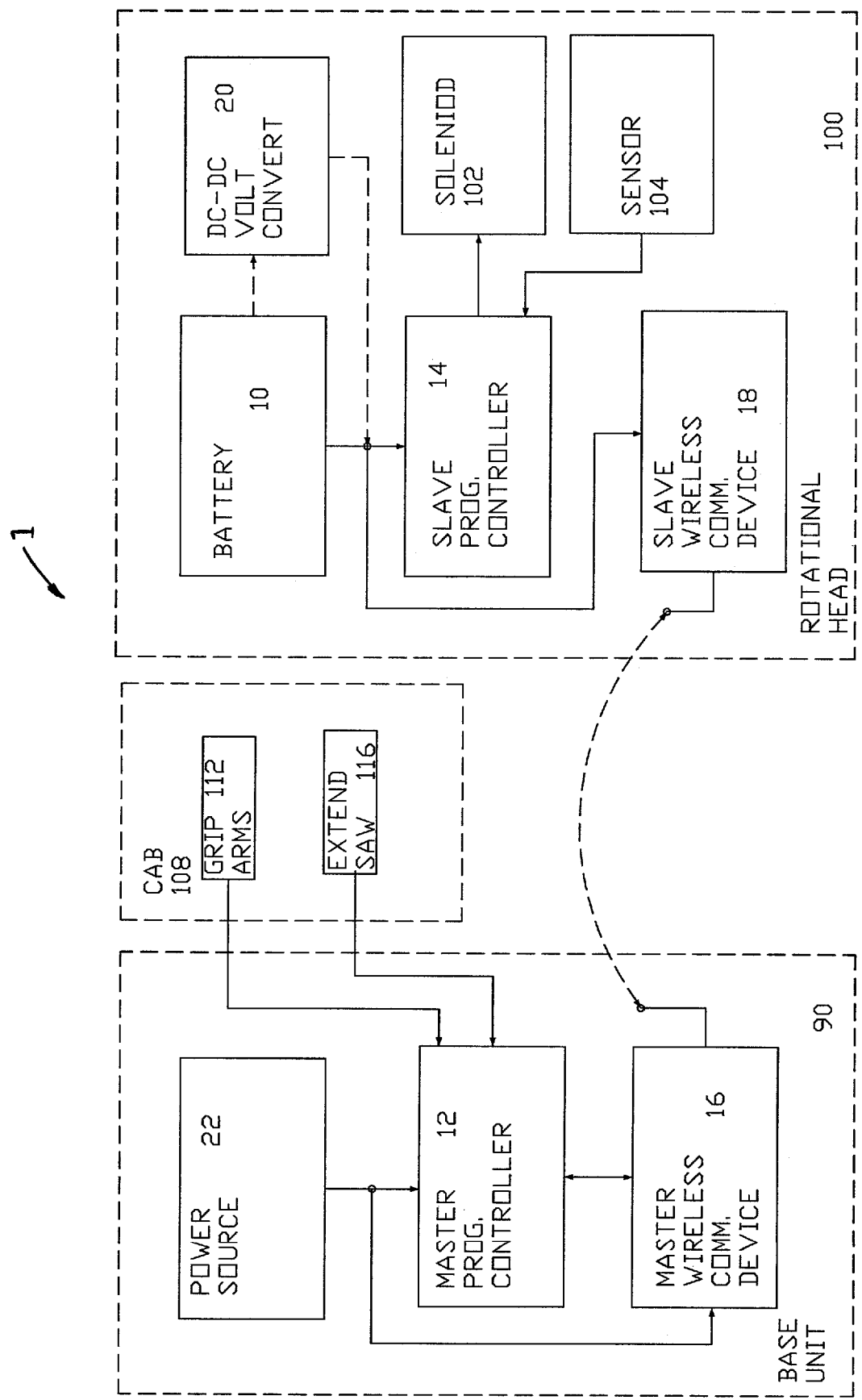
FIG. 1 is a schematic diagram of a battery powered wireless controller system in accordance with the present invention.

With reference now to the drawings, and particularly to FIG. 1, there is shown a battery powered wireless controller system 1. The battery powered wireless controller system 1 preferably includes at least one battery 10, a master programmable controller 12, a slave programmable controller 14, a master wireless communication device 16 and a slave wireless communication device 18. Each battery 10 is preferably a power tool battery, but other types of batteries may also be used. The at least one battery 10 is retained in a battery holder (not shown). The master and slave programmable controllers 12 are preferably any suitable microprocessor based controller. The slave programmable controller 14 must be capable of receiving inputs between 5 volts-36 volts. It is preferable that the slave programmable controller have 5, 12 and 24 volt output ports. The at least one battery 10 may output any suitable voltage. However, if the battery 10 has an output voltage of over 36 volts, a DC-DC voltage converter 20 is preferably used to convert the higher battery voltage to 12 volts, 24 volts or any other suitable voltage.

The master wireless communication device 16 is connected to the master programmable controller 12. The slave wireless communication device 18 is connected to the slave programmable controller 14. The master programmable controller 12 sends instructions to the slave programmable controller 14 through the master and slave wireless communications 16, 18. The communication protocol between the master and slave controllers 16, 18 is preferably a CAN (Controller Area Network). The master and slave wireless communication devices 16, 18 preferably use Bluetooth, but other wireless protocols may also be used.

Figure 1A:
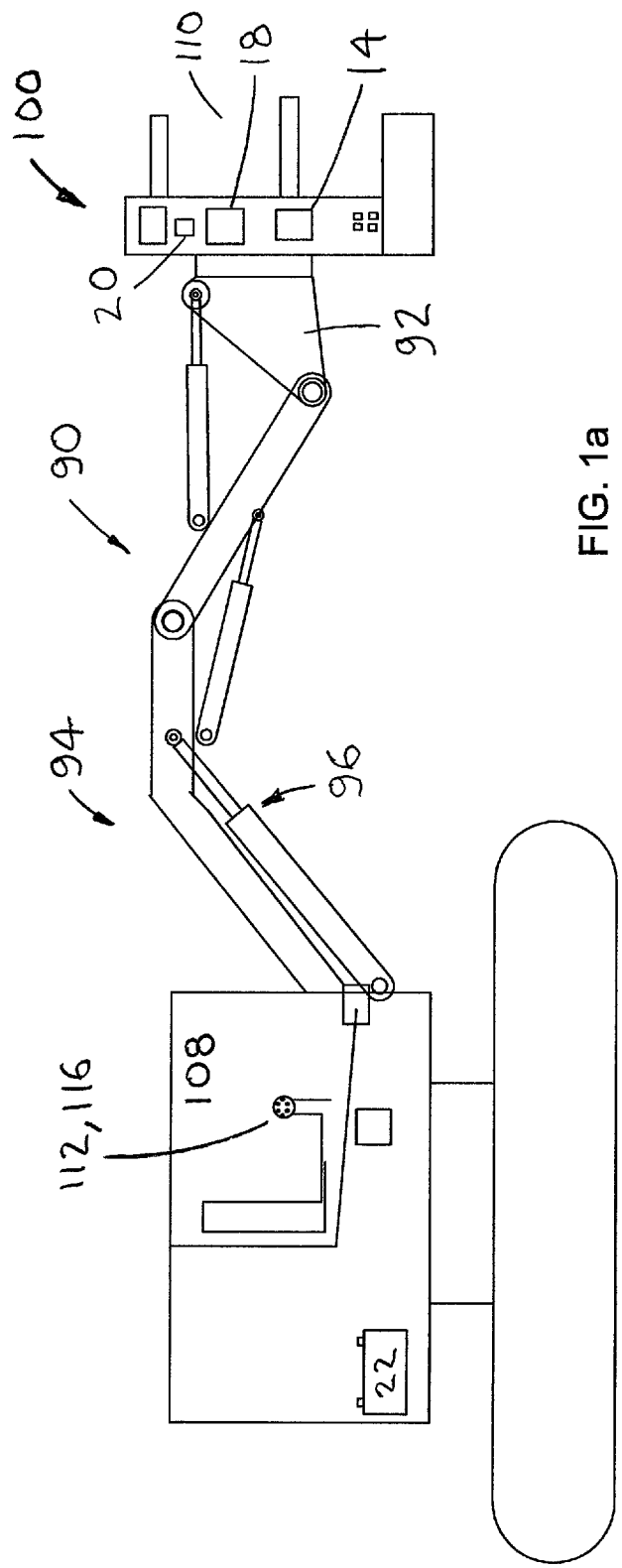
FIG. 1a is a schematic diagram of a excavator with a saw head attached thereto of a battery powered wireless controller system in accordance with the present invention.
Figure 2:
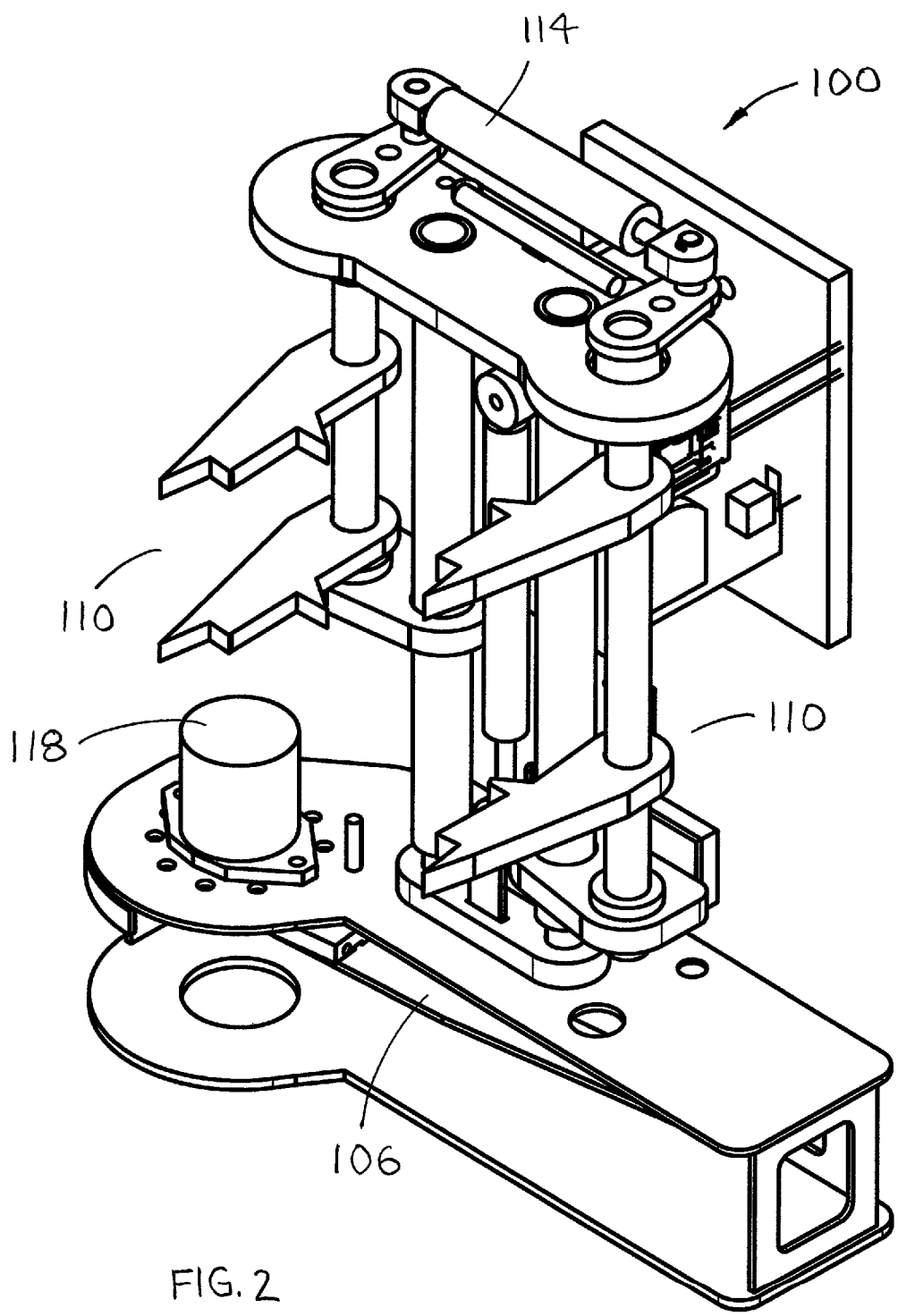
FIG. 2 is a perspective view of a saw head, which utilizes a battery powered wireless controller system in accordance with the present invention.

With reference to FIG. 1a, the master programmable controller 12 and the master wireless communication device 16 are attached to a base unit 90 and electrically connected to a DC source of electrical power 22 from the base unit 90. The base unit 90 includes a rotary mount 92, and an excavator 94. With reference to FIG. 2, the battery holder, the slave wireless communication device 18 and the slave programmable controller 14 are retained on a saw head 100. The slave programmable controller 14 and the slave wireless communication device 18 are powered by the at least one battery 10 through power input ports. Output ports of the slave programmable controller 14 are electrically connected to at least one hydraulic valve solenoid 102. Each hydraulic valve solenoid 102 controls the flow of hydraulic fluid to a hydraulic cylinders, a hydraulic rotary actuator 118 or any other hydraulically operated device. At least one input port of the slave programmable controller is preferably electrically connected to at least one sensor 104. The at least one sensor 104 detects a position of a chain saw 106.

In use, the rotational head 100 is rotationally retained on the rotary mount 92. The rotary mount 92 is retained on an end of a boom 96 of the excavator 94. An example of a similar rotary dangle head is disclosed in U.S. Pat. No. 7,735,530 to Riha et al., which is hereby incorporated by reference in its entirety. Joysticks and buttons are contained in a operator cab 108 of the excavator 94 for controlling the motion of the rotational head 100. The DC source of electrical power 22, the master programmable controller 12 and the master wireless communication device 16 are preferably retained in the cab 108.

To grab a board (not shown) the operator will move the boom 96 of the excavator 94 and control rotation of the saw head 100 with the rotary mount 92, such that the board may be gripped by the grip arms 110. A grip arm button 112 or a like actuation device in the operator cab 108 is manipulated to grip the board by powering a solenoid 102 of at least one hydraulic valve. The master programmable controller 12 receives a signal from the actuation of the grip arm button 112. The master programmable controller 12 sends a packet of information to the slave programmable controller 14 to actuate the solenoid 102 in a hydraulic valve to extend a hydraulic cylinder 114 to close the grip arms 110 to retain the board. An extend saw button 116 is actuated to extend the chain saw 106 with a hydraulic rotary actuator 118. The hydraulic rotary actuator 118 is used to extend the chain saw 106. The at least one sensor 104 is used to determine whether the chain saw 106 is extended or not.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A battery powered wireless controller system for use on equipment having a stationary portion and a saw head capable of rotating relative to the stationary portion, comprising:
   at least one battery being replaceable and replaceable, said at least one battery having a voltage between 5-36 volts;
   a master programmable controller;
   a master wireless communication device is connected to said master programmable controller, said master programmable controller and said master wireless communication device are retained on the stationary portion, said stationary portion is a base unit;
   at least one actuation device is connected to an input port of said master programmable controller, said at least one actuation device provides a control signal to said master programmable controller;
   a slave programmable controller;
   a slave wireless communication device is retained on the saw head and connected to said slave programmable controller, said at least one battery provides electrical power to said slave wireless communication device and said slave programmable controller, said slave programmable controller receives wireless instructions from said master programmable controller through said master and slave wireless communication devices, said slave programmable controller and said at least one battery are retained on the saw head and capable of rotating relative to said master controller, wherein said slave programmable controller provides electrical power to a solenoid of a hydraulic valve for operation of at least one hydraulic powered device; and
   at least one sensor for determining whether the at least one hydraulic powered device is in an extended position.

2. The battery powered wireless controller system of claim 1 wherein:
   each one of said at least one battery is a power tool battery.

3. The battery powered wireless controller system of claim 1 wherein:
   said slave programmable controller, said slave wireless communication device and said at least one battery are retained on a rotational head.

4. A battery powered wireless controller system for use on equipment having a stationary portion and a saw head capable of rotating relative to the stationary portion, comprising:
   at least one battery being replaceable and rechargeable, a DC-DC voltage converter for converting a voltage of said at least one battery which is over 36 volts to a voltage of less than 36 volts;
   a master wireless communication device is connected to said master controller;
   a master programmable controller, said master programmable controller and said master wireless communication device are retained on the stationary portion, said stationary portion is a base unit;
   at least one actuation device is connected to an input port of said master programmable controller, said at least one actuation device provides a control signal to said master programmable controller;
   a slave programmable controller;
   a slave wireless communication device retained on the saw head and is connected to said slave programmable controller, said at least one battery provides electrical power to said slave wireless communication device and said slave programmable controller, said slave programmable controller receives wireless instructions from said master programmable controller through said master and slave wireless communication devices, said slave wireless programmable controller and said at least one battery are retained on the saw head, wherein said slave programmable controller provides electrical power to a solenoid of a hydraulic valve for operation of at least one hydraulic powered device; and
   at least one sensor for determining whether the at least one hydraulic powered device is in an extended position.

5. The battery powered wireless controller system of claim 4 wherein:
   each one of said at least one battery is a power tool battery.

6. The battery powered wireless controller system of claim 4 wherein:
   said slave programmable controller, said slave wireless communication device and said at least one battery are retained on a rotational head.

* * * * *